(12) United States Patent
Koneval et al.

(10) Patent No.: US 6,324,788 B1
(45) Date of Patent: Dec. 4, 2001

(54) SLIDING WINDOW REGULATOR WITH DISCONNECTABLE POWER FEATURE

(75) Inventors: Kevin Koneval, Sterling Heights; Jeffrey W. Kolar, Livonia, both of MI (US)

(73) Assignee: Hi-Lex Corporation

(*) Notice: Subject to any disclaimer, the term of this patent is extended or adjusted under 35 U.S.C. 154(b) by 0 days.

(21) Appl. No.: 09/498,274

(22) Filed: Feb. 4, 2000

(51) Int. Cl.$^7$ ............................................. E05C 7/06
(52) U.S. Cl. ..................................... 49/121; 49/360
(58) Field of Search ............................. 49/118, 120, 121, 49/360, 380, 413

(56) References Cited

U.S. PATENT DOCUMENTS

| | | | |
|---|---|---|---|
| 4,995,195 | * | 2/1991 | Olberding et al. ............... 49/118 |
| 5,146,712 | * | 9/1992 | Hlavaty ............................ 49/118 |
| 5,531,046 | * | 7/1996 | Kollar et al. ..................... 49/360 |
| 5,613,323 | * | 3/1997 | Buening ........................... 49/380 |
| 5,669,181 | | 9/1997 | Kollar et al. . |
| 5,724,769 | * | 3/1998 | Cripe et al. ...................... 49/360 |
| 5,784,833 | * | 7/1998 | Sponable et al. ................. 49/360 |
| 5,822,922 | * | 10/1998 | Grumm et al. ................... 49/360 |
| 6,021,605 | * | 2/2000 | Laux et al. ....................... 49/361 |
| 6,026,611 | * | 2/2000 | Ralston et al. ................... 49/123 |
| 6,112,462 | * | 9/2000 | Kolar ................................ 49/121 |
| 6,119,401 | * | 9/2000 | Lin et al. .......................... 49/361 |
| 6,125,585 | * | 10/2000 | Koneval et al. .................. 49/349 |

\* cited by examiner

*Primary Examiner*—Daniel P. Stodola
*Assistant Examiner*—Curtis A. Cohen
(74) *Attorney, Agent, or Firm*—Young & Basile

(57) ABSTRACT

A powered window regulator for use with a horizontally sliding window assembly may be disconnected from a sliding pane to permit manual operation of the window. The regulator has a tubular guide rail mounted adjacent and parallel to the lower edge of the window assembly by pivot brackets which engage the respective ends of the guide rail such that the guide rail is rotatable about the pivot brackets. A carrier block slides within the guide rail, and a portion of the block extends out through a longitudinal slot extending along the length of the guide rail to engage a pane attachment affixed to the sliding pane. The carrier block is moved reciprocally along the guide rail by a motor-driven cable to slide the sliding pane between open and closed positions. Rotation of the guide rail about the pivot brackets through approximately ninety degrees moves the carrier block between an upright position wherein it engages the pane attachment and a depressed position wherein it is disengaged from the pane attachment. Each pivot bracket comprises a bearing pin which fits into the end of the tubular guide rail and a conduit end fitting for receiving the end of a protective conduit which surrounds the drive cable.

17 Claims, 5 Drawing Sheets

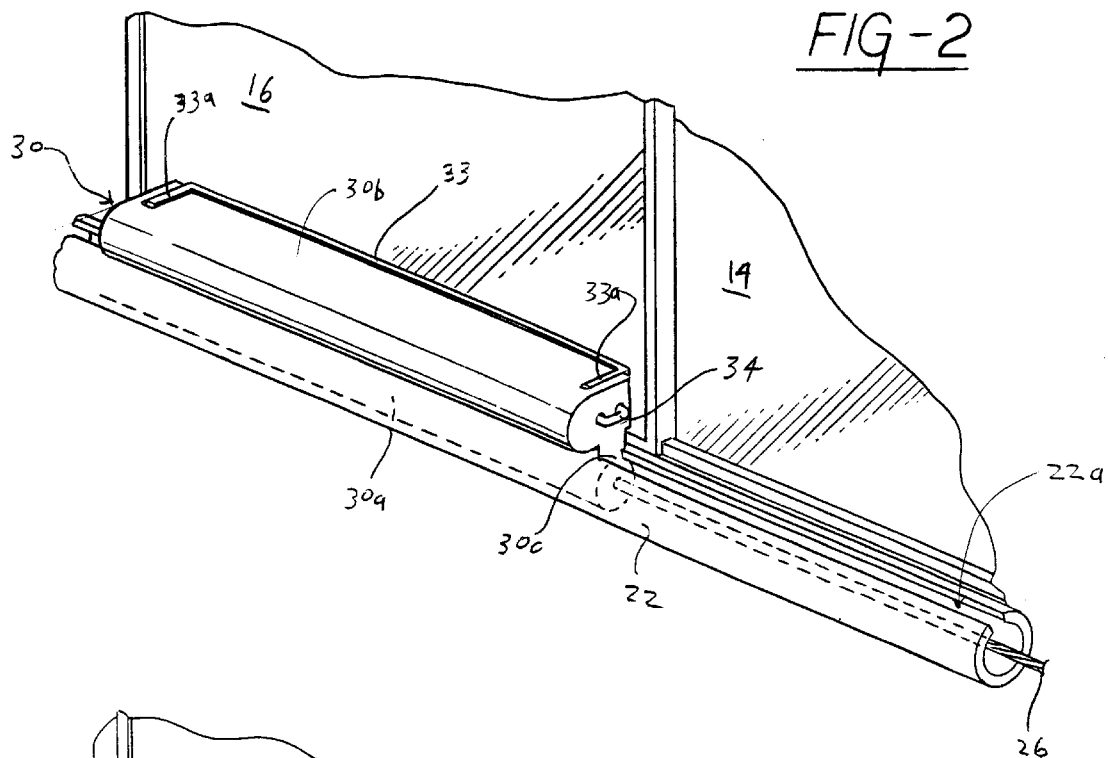
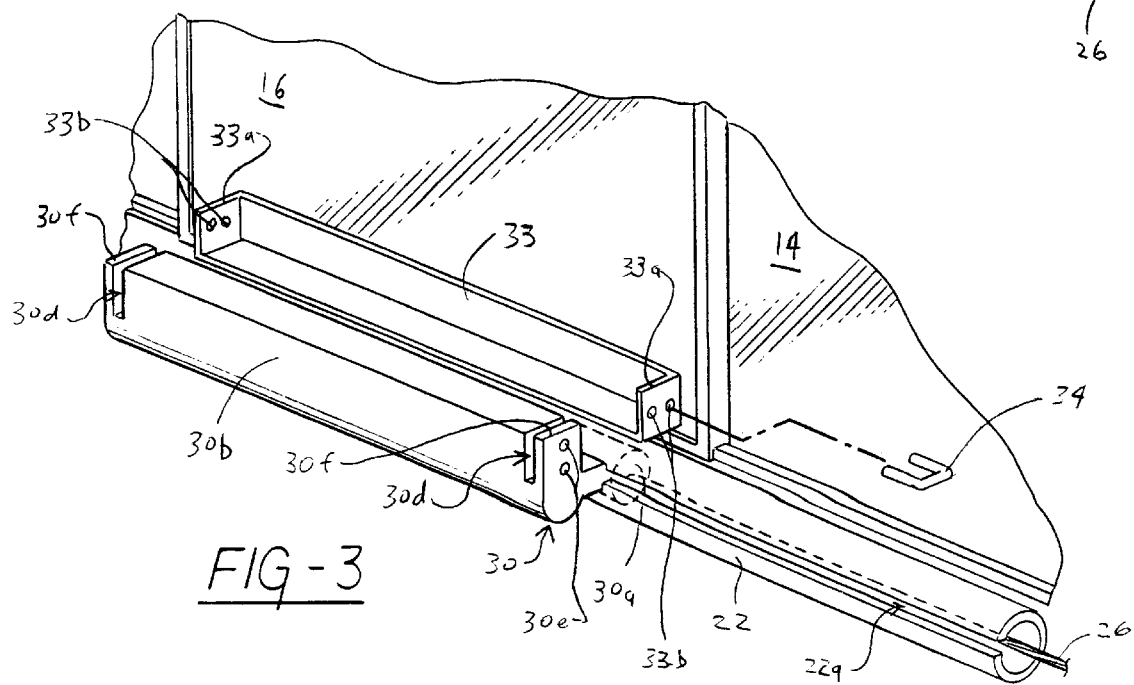

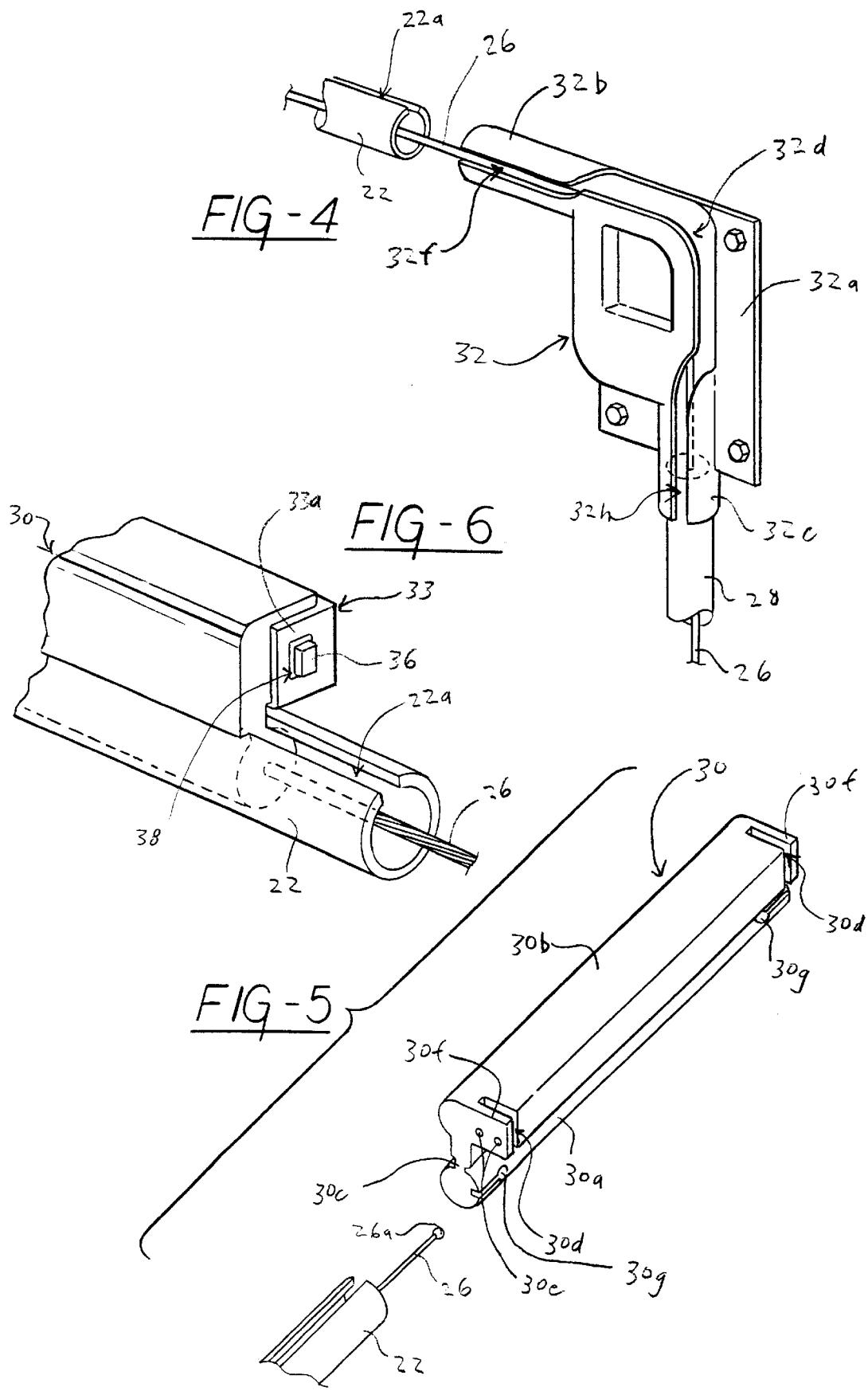

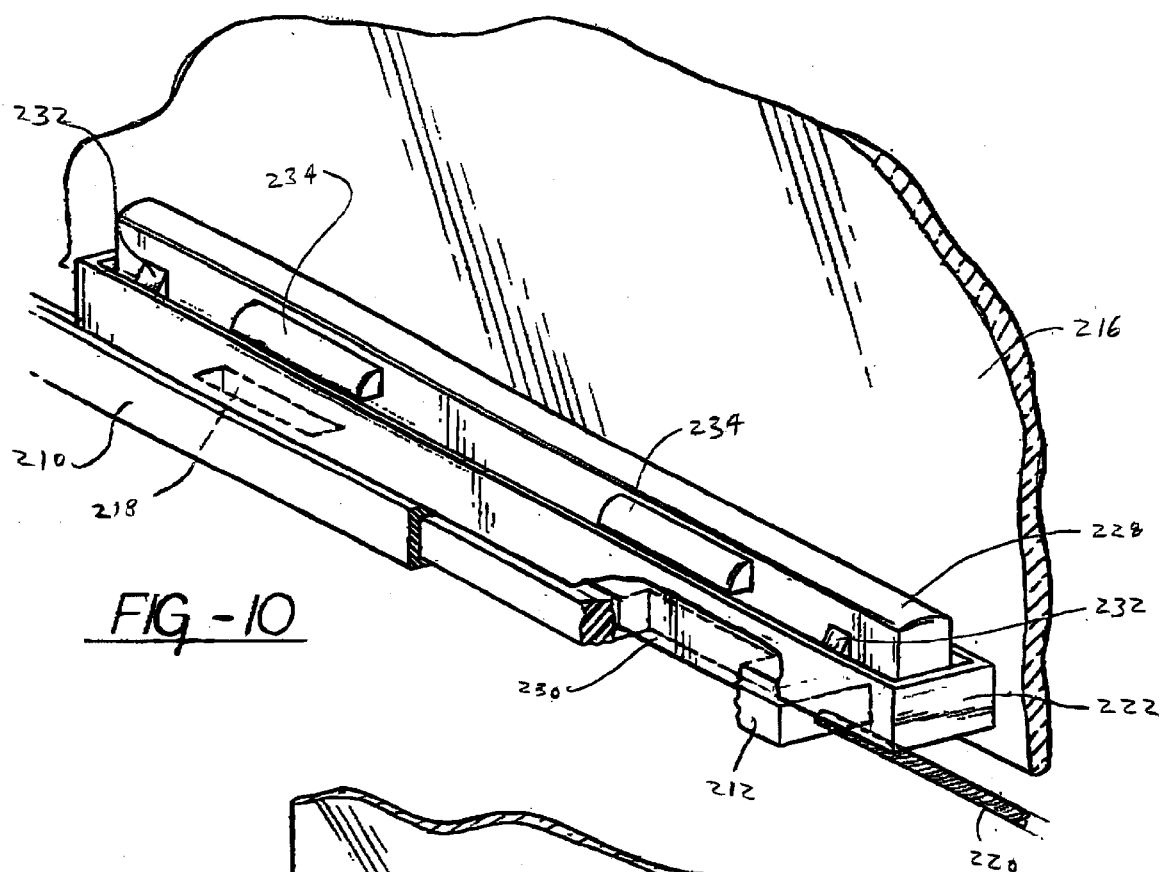
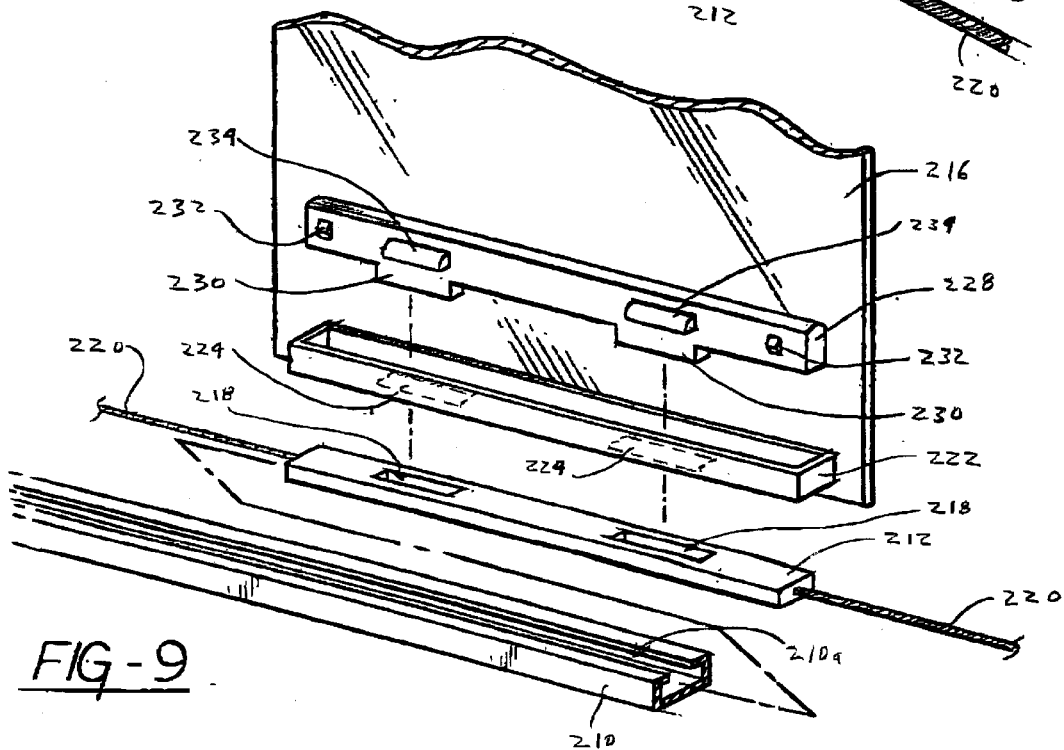

SLIDING WINDOW REGULATOR WITH DISCONNECTABLE POWER FEATURE

FIELD OF THE INVENTION

This invention relates to powered window regulators for actuating horizontally sliding window panes in motor vehicle window assemblies, and more particularly to a powered window regulator that may be easily disconnected from the sliding pane to allow manual operation.

BACKGROUND OF THE INVENTION

It is known to fit the rear window opening of a truck cab with a sliding window assembly made up of a pair of stationary panes mounted outboard in a window opening to define a gap therebetween, and one or two sliding panes retained along their upper and lower edges in guide tracks for horizontal movement. Many different electrically powered window regulator mechanisms have been proposed to allow an occupant of the truck to open and close the sliding window by actuating a switch.

These prior art regulator mechanisms generally include a guide rail extending along the lower edge of the window assembly and one or more pane carrier blocks reciprocally movable along the guide rail. A reversible electrical motor drives a cable, slotted tape, or a rack-and-pinion mechanism to move the carrier block along the guide rail, and the carrier block engages an attachment secured to the sliding pane to pull it between the open and closed positions.

One drawback to the previously-known regulator mechanisms becomes apparent if there is a failure in the motor, electrical power supply, or other critical component of the drive system. In the event of such as a failure, it is important that the occupant of the truck be able to open and close the window manually. Heretofore, it has been impossible or inconvenient for the occupant to disengage the regulator mechanism from the sliding panes to permit such manual operation.

Another limitation of the prior art regulator mechanisms is that the carrier blocks make a rigid connection with the pane attachment on the sliding pane so that any movement of the pane perpendicular to the direction of sliding movement and any tipping of the pane is transferred directly to the carrier blocks, and vice versa. Accordingly, the rigid connection between the carrier blocks and the pane may tend to cause binding problems when the track in which the sliding pane travels is not perfectly flat and parallel with the guide track in which the carrier blocks slide.

U.S. Patent application Ser. No. 09/126,649, assigned to the assignee of the present patent application, discloses a window regulator in which a pane carrier engages a sliding pane by means of a male/female connection which restrains the sliding pane against tipping and binding within its guide track yet allows relative movement between the pane carrier and the sliding pane along an axis perpendicular to the pane. This type of connection allows the regulator to operate properly, without binding or jamming, when attached to a window assembly that is not perfectly flat along in the direction of sliding movement. It is also simplifies the assembly process, since the regulator does not have to be attached to the window assembly with a great deal of precision.

SUMMARY OF THE INVENTION

A window regulator for use with a horizontally sliding window assembly comprises a guide rail extending parallel to the path of travel of the sliding pane, at least one carrier block engaged with the guide rail for reciprocal movement therealong, a pane attachment securable to the sliding pane, and a flexible drive member connected to the carrier block to move it reciprocally along the guide rail. According to the invention, at least one of the carrier block and the pane attachment is movable between a first position wherein the carrier block is engaged with the pane attachment and a second position wherein the carrier block is disengaged from the pane attachment such that the sliding pane is movable between the open and closed positions independently from the carrier block.

In a first embodiment of the invention disclosed herein, the guide rail comprises an elongated tube having a longitudinal slot and is mounted to the window assembly by first and second pivot brackets which engage the respective ends of the guide rail. The carrier block comprises a cylindrical lower section which is retained within the guide rail and connected to a drive cable to slide it along the rail, and an upper section which projects through the slot. Rotation of the guide rail about the pivot brackets through approximately ninety degrees moves the carrier block between an upright position wherein it engages the pane attachment affixed to the sliding pane and a depressed position wherein it is disengaged from the pane attachment.

The pane attachment preferably extends along substantially the entire length of the lower edge of the sliding pane, and has an tab at either end projecting perpendicularly outwardly from the pane adjacent the lower corners thereof. The tabs fit into vertical notches in the upper portion of the carrier block when it is rotated to the upright position. The tabs and carrier block preferably have complemental detent means for achieving a positive engagement therebetween.

According to another feature of the invention, each pivot bracket comprises a bearing pin which fits into the end of the tubular guide rail such that the guide rail may pivot about the pin, and a conduit end fitting for receiving the end of a protective conduit which surrounds the drive cable. The cable extends through a passage formed in the pivot bracket and into the interior of the guide rail where it is attached to the carrier block. The bearing pin and the end fitting preferably are oriented at approximately 90 degrees to one another and are connected by a curved cable guide trough through which the drive cable slides when the regulator is activated. The passage through the pivot bracket is preferably formed by radial slots which extend along the longitudinal axes of both the bearing pin and the end fitting, so that the drive cable may be slipped into engagement with the pivot bracket from the side during assembly of the regulator. This simplifies of the assembly of the regulator, since the cable does not have to be threaded axially through the bracket.

In a second embodiment of the invention, the pane attachment comprises a first portion secured to the sliding pane and defining a cavity, and a second portion located within the cavity. The second portion is movable between a lowered position wherein it projects through windows in the bottom of the first portion to engage the carrier block and a raised position wherein it is disengaged from the carrier block. This embodiment allows the sliding pane to be disconnected from the power regulator for manual operation by simply pushing upwardly on the second pane attachment portion to move it to the raised position.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2 is a partial perspective view of the window regulator of FIG. 1 with the carrier block engaged with a sliding pane;

FIG. 3 is a view similar to FIG. 2, but with the carrier block disengaged from the sliding pane;

FIG. 4 is a detail view of the pivot bracket of the window regulator of FIG. 1;

FIG. 5 is a detail view of the carrier block of the window regulator of FIG. 1;

FIG. 6 is a detail view of an alternative embodiment of a carrier block;

FIG. 9 is an exploded view of a second embodiment of the invention window regulator; and FIG. 10 is an assembly view of the window regulator of FIG. 9.

DESCRIPTION OF THE PREFERRED EMBODIMENT

Figure 1:
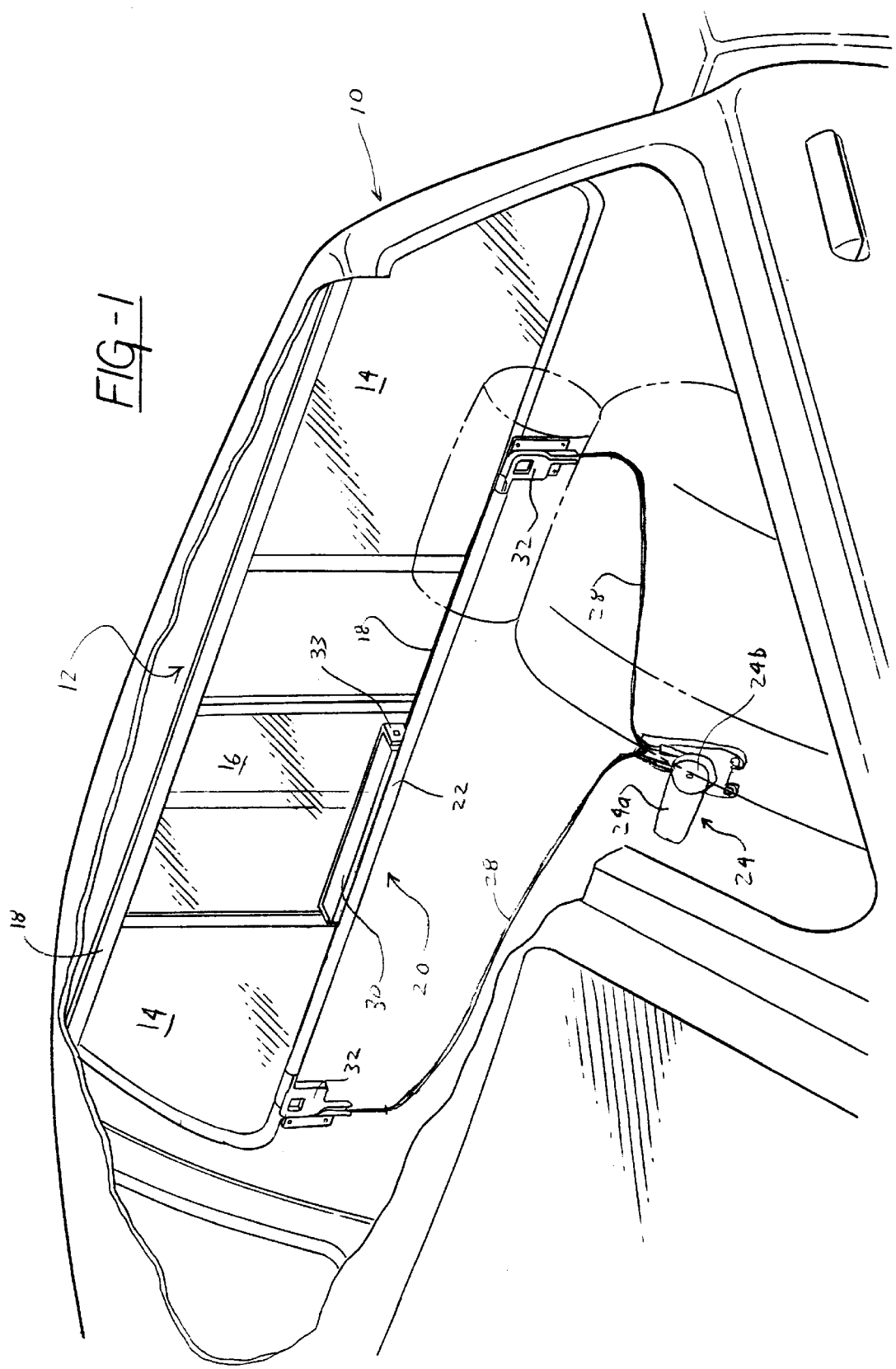
FIG. 1 is an environmental view showing a window regulator according to the invention installed in a pick-up truck cab.

Referring to FIG. 1, a truck cab 10 includes a window assembly 12 having first and second fixed panes 14 located at opposite ends of a rear window opening, and a sliding pane 16 mounted in guide tracks 18 extending across the top and bottom of the window opening. A window regulator 20 according to the present invention comprises an elongated guide rail 22 attached to the window assembly 12 adjacent the lower edge thereof on the interior of the truck cab 10, and a drive unit 24 mounted within the cab at a location remote from the guide rail 22. A pair of flexible, protective conduits 28 extend from the drive unit 24 to the opposite ends of the guide rail 22. A drive cable 26 (see FIGS. 2–5) passes through conduits 28 and the opposite ends of the drive cable are connected to a carrier block which is mounted for reciprocal sliding movement along the guide rail 22. The carrier block 30 is engaged with the sliding pane 16 to move it along its tracks 18 when the drive unit 24 is energized.

The drive unit 24 is conventional in construction, comprising a reversible electric motor 24a which rotates a drive drum 24b, and is mounted to a surface within the truck cab 10, preferably in a location where it is out of plain sight. The motor 24a is supplied with 12-volt DC electrical power from the vehicle electrical system and is preferably controlled by a three-position switch (not shown) located within the truck cab where it may be easily reached by occupants of the cab.

As best seen in FIG. 2, the guide rail 22 is an elongated tube having a narrow slot 22a extending parallel to its longitudinal axis. The guide rail 22 is supported at either end by first and second pivot brackets 32 attached to the window assembly 12 immediately below the lower edge of the fixed panes 14. As best seen in FIG. 4, each pivot bracket 32 comprises a mounting plate 32a, a cylindrical bearing pin 32b extending horizontally adjacent the top of the mounting plate, a conduit end fitting 32c extending downwardly from the bottom of the mounting plate, and an arcuate cable trough 32d extending between the bearing pin and the conduit end fitting. The bearing pin 32b has a radial slot 32f extending along its axis. The end fitting 32c has a radial slot 32h similar to that formed in the bearing pin 32b. The cable trough 32d and slots 32f, 32h combine to constitute a passage through the pivot bracket 32.

The pivot brackets 32 are secured to the cab structure adjacent the lower part of the window assembly 12 by bolts, screws, adhesive or other suitable fastening means, and the bearing pins 32b project into the respective opposite ends of the guide rail 22 to support the guide rail in a horizontal orientation. The bearing pins 32b have outside diameters slightly smaller than the inside diameter of the guide rail 22 so that the guide rail 22 may freely pivot about the pins.

The carrier block 30 is preferably formed from a high-strength plastic material and comprises a generally cylindrical lower portion 30a, an upper portion 30b generally in the shape of a rectangular parallelepiped, and a narrow waist 30c connecting the upper and lower portions (see FIG. 5). The carrier block 30 is approximately equal in length to the sliding pane 16, and the lower portion 30a is sized to fit within and slide freely along the interior of the guide rail 22, with the waist 30c extending through the guide rail slot 22a. Vertical notches 30d pass through the upper portion 30b adjacent the opposite ends thereof, and two holes 30e pass through the thin walls 30f outboard of the notches 30d at either end. First and second receptacles 30g are formed in the lower portion 30a of the carrier block 30 adjacent opposite ends thereof.

A pane attachment 33 is secured to the lower edge of the sliding pane 16 and extends along substantially the entire length thereof. In the preferred embodiment of the invention, the pane attachment 33 is a thin piece of metal having an L-shaped cross section and tabs 33a projecting perpendicularly outwardly from the pane 16 adjacent the lower corners thereof. Two small holes 33b are formed in each tab 33a. The pane attachment 33 is preferably secured to the pane 16 by an appropriate adhesive.

The conduits 28 extend between the drive unit 24 and opposite ends of the guide rail 22, where they are secured to respective pivot brackets 32, preferably by sliding inside of the end fittings 32c. The drive cable 26 wraps around the drive drum of the drive unit and each end of the cable extends through its respective conduit 28, upwardly through the slot 32h in the end fitting 32c, around the cable trough 32d, through the slot 32f in the bearing pin 32b and into the interior of the guide rail 22. The ends of the cable 26 are secured to the carrier block 30 by, for example, inserting beads 26a at the ends of the cable 26 into the receptacles 30g.

The invention regulator 20 is quickly and simply assembled prior to securing it to the window assembly 12. The ends of the cable 26 are engaged with their respective pivot brackets 32 by slipping the cable into the slot 32h in the end fitting 32c and the slot 32f in the bearing pin 32b so that the cable 26 extends around and is retained in the cable trough 32d. The bearing pins 32b are then inserted into the respective opposite ends of the guide rail 22, and the pivot brackets 32 are secured to the window assembly 12.

The vertical notches 30f in the carrier block upper portion 30b are spaced apart by a distance matching that between the out-turned tabs 33a of the pane attachment 33. When the guide rail 22 is pivoted to orient the notch 22a upwardly, the pane attachment tabs 33a fit into the vertical notches 22a and the holes 30e in the carrier block 30 are aligned with the holes 33b in the tabs, as shown in FIG. 2. A two-pronged carrier pin 34 is then inserted through the aligned holes 30e, 33b at each end of the carrier block 30 to secure the carrier block in connection with the pane attachment 33. In this engaged configuration, motion of the carrier block 30 along the guide rail 22 is transferred positively to the sliding pane 16, moving it along its guide tracks 18 between the open and closed positions. The engagement between the carrier block 30 and the pane attachment 33 at widely spaced points adjacent the lower corners of the sliding pane 16 provides increased stability of the sliding pane as it moves between its open and closed positions.

When it is desired to move the sliding pane 16 manually, the carrier pins 34 are withdrawn from both ends of the carrier block 30 and the guide rail 22 is pivoted approximately 90° about the bearing pins 32d so that the carrier block upper portion 30b rotates away from the sliding pane 16 and the pane attachment tabs 33a are withdrawn from the vertical notches 22a, as depicted in FIG. 3. This completely disengages the regulator 20 from the sliding pane 16 so that the pane may be moved manually.

FIG. 6 shows an embodiment of the invention having an alternative form of engagement between the carrier block 30 and the pane attachment 33. A spring-loaded button 36 projects outwardly from each end of the carrier block 30 and fits into a rectangular hole 38 formed in the pane attachment tab 33a. To disconnect the carrier block 30 from the sliding pane, the buttons 36 are pressed inwardly to disengage them from the holes 38 in the tabs 33a, and the guide rail 22 and carrier block 30 are then rotated away from the sliding pane and out of engagement with the pane attachment. Any number of different ways to achieve positive engagement between the pane attachment 33 and the carrier block 30 are possible and will be readily apparent to one of skill in the mechanical arts.

Figures 7, 8:
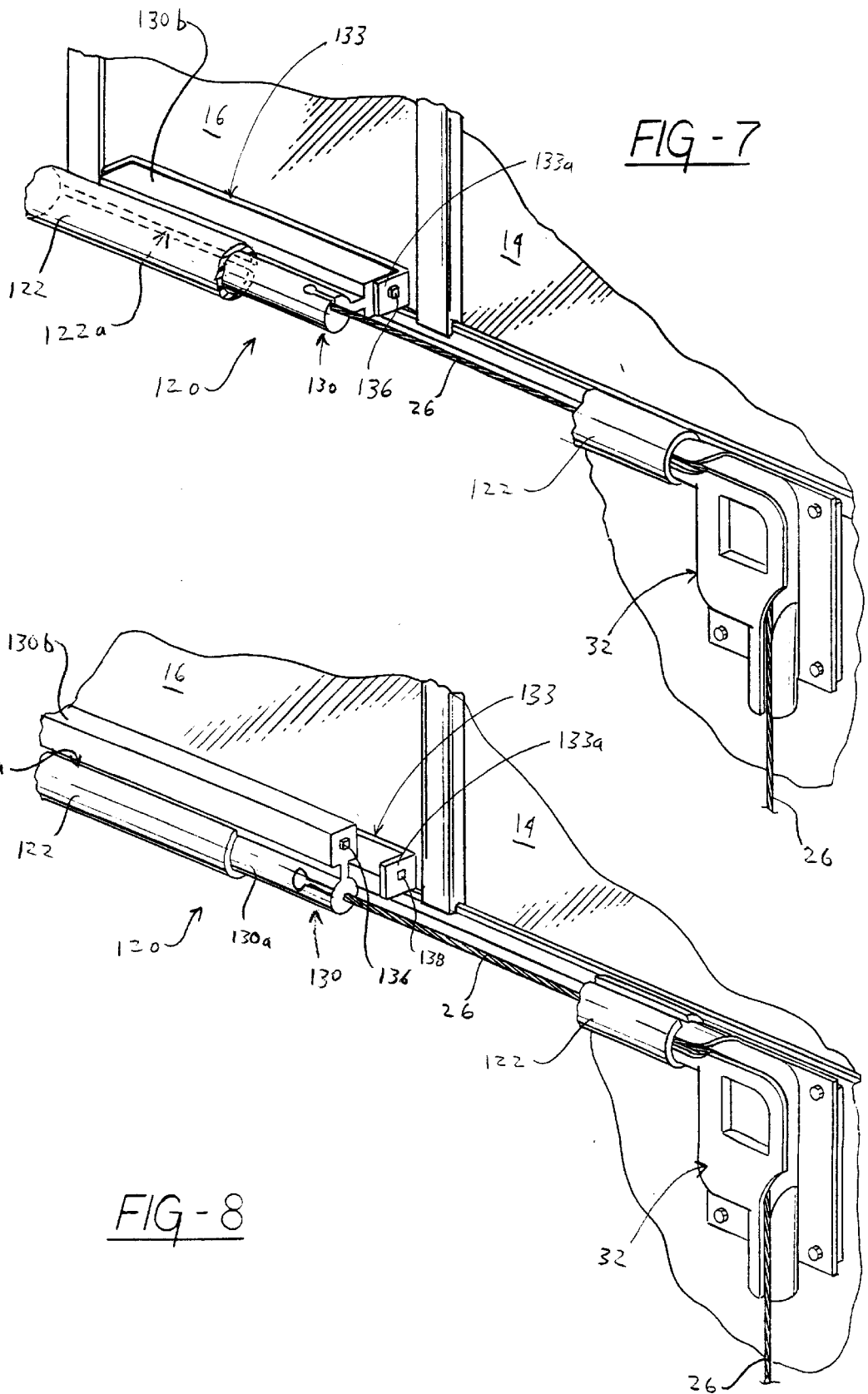
FIG. 7 is a perspective view of an alternative embodiment of a window regulator according to the invention, with the carrier block engaged with a sliding pane.
FIG. 8 is a perspective view of the window regulator of FIG. 7, with the carrier block disengaged from the sliding pane.

FIGS. 7 and 8 depict an alternative embodiment of a window regulator 120 according to the present invention wherein the guide rail 122 is substantially level with the pane attachment 133, rather than below it as in the first disclosed embodiment. To permit powered operation of the window, the guide rail 122 is rotated so that the slot 122a is oriented horizontally toward the sliding pane 116 (see FIG. 7) and the carrier block upper portion 130b extends directly out into engagement with the pane attachment 133. To permit manual operation of the window (see FIG. 8), the guide rail 122 is rotated approximately 90 degrees so that the slot 122a and the carrier block upper portion 130b are oriented upwardly. The carrier block 130 is shown with spring-loaded buttons 136 which engage rectangular holes 138 in the pane attachment tabs 133a, but it is to be understood that the scope of the invention includes any suitable means of engagement between the pane attachment 133 and the carrier block 130.

It is also possible to practice the present invention in relation to a regulator for a window assembly having two opposingly movable sliding panes. In such a dual sliding pane system regulator, there would be a separate carrier block and pane attachment for each sliding pane. One or more drive cables would be attached to the carrier blocks and routed as necessary to drive the sliding panes in opposite directions between their open and closed positions. U.S. Patent application Ser. Nos. 09/126,649 and 09/122,605, the disclosures of which are incorporated herein by reference, disclose dual slider systems which could be modified to include features of the present invention.

Referring now to FIGS. 9 and 10, an alternative embodiment of the invention has a fixed, non-rotating guide rail 210, a carrier block 212 retained therein for sliding movement, and a two-piece pane attachment 222,228 which is detachable from the carrier block to permit manual movement of sliding pane 216.

Guide rail 210 has a generally C-shaped cross-section with its opening 210a oriented upwardly. Opposite ends of guide rail 210 are fixed to the window assembly or adjacent cab structure in a manner known in the window regulator art. Carrier block 212 has slots 218 formed in the upper surface thereof which are accessible through opening 210a. Drive cables 220 are attached to opposite ends of carrier block 212 and extend to a drive unit (not shown) to move the carrier block along guide rail 210.

Lower pane attachment 222 is affixed to the sliding pane 216 by adhesive or other appropriate means and forms an upwardly-opening cavity 222a. Two rectangular windows 224 are formed in the bottom wall of lower pane attachment 222.

Upper pane attachment 228 is sized to fit downwardly into cavity 222a and has engagement tabs 230 extending downwardly from a lower edge thereof. Upper pane attachment 228 is retained within the cavity 222a for limited vertical movement with respect to lower portion by, for example, detent bumps 232 projecting from the upper pane attachment and engaging complementally shaped notches (not shown) formed on the inner surfaces of lower pane attachment 222.

When upper pane attachment 228 is fully seated in cavity 222a, engagement tabs 230 project downwardly through windows 224 and into engagement with slots 218 in carrier block 212. In this condition, powered movement of carrier block 212 along guide rail 210 is positively transferred to sliding pane 216. When it is desired to move sliding pane 216 manually, a person inside the truck cab pushes the upper pane attachment 228 upwardly with respect to lower pane attachment 222 so that engagement tabs 230 are withdrawn from slots 218. Ridges 234 or similar features may be provided to make it easier to grip and lift upper pane attachment 228. In this condition, pane attachment and sliding pane 216 are fully disconnected from carrier block 212. Detent bumps 232 preferably hold upper pane attachment in the raised position until it is intentionally pushed back down again when it is desired to resume powered operation of the regulator.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A window regulator for use with a vehicle window assembly having at least one sliding pane movable along a generally horizontal path between an open and a closed position, the regulator comprising a guide rail with a longitudinal axis adapted to extend parallel to the path of travel of the sliding pane, at least one carrier block engaged with the guide rail for reciprocal movement along the longitudinal axis, a pane attachment securable to the sliding pane, and a drive mechanism having at least one flexible drive member attached to the carrier block to impart said reciprocal movement to the carrier block, characterized in that:

the regulator includes bearing means mounting the carrier block for rotation between a first angular position wherein the carrier block is engaged with the pane attachment to transfer said reciprocal movement to the sliding pane and a second angular position wherein the carrier block is disengaged from the pane attachment whereby the sliding pane is movable between the open and closed positions independently from the carrier block.

2. The window regulator according to claim 1 wherein the drive member is a cable.

3. The window regulator according to claim 2 wherein the drive mechanism comprises a drive drum engaged with the cable and a reversible electric motor for rotating the drive drum.

4. The window regulator according to claim 1 wherein the regulator further includes coacting fastener means on the carrier block and on the pane attachment operative to selectively fixedly couple the carrier block to the pane attachment with the carrier block in its first angular position and disengage the carrier block from the pane attachment to allow rotation of the carrier block to its second angular position.

5. The window regulator according to claim 4 wherein the bearing means mount the guide rail for rotation about its longitudinal axis and the carrier block is mounted for rotation with the guide rail.

6. A window regulator for use with a vehicle window assembly having at least one sliding pane movable along a generally horizontal path between an open and a closed position, the regulator comprising a guide rail with a longitudinal axis adapted to extend parallel to the path of travel of the sliding pane, at least one carrier block engaged with the guide rail for reciprocal movement along the longitudinal axis, a pane attachment securable to the sliding pane, and a drive mechanism having at least one flexible drive member attached to the carrier block to impart said reciprocal movement to the carrier block, characterized in that:

the regulator includes bearing means mounting the carrier block for rotation between a first angular position wherein the carrier block is engaged with the pane attachment to transfer said reciprocal movement to the sliding pane and a second angular position wherein the carrier block is disengaged from the pane attachment whereby the sliding pane is movable between the open and closed positions independently from the carrier block; and the bearing means further comprises first and second bearings engaged with respective ends of the guide rail and attachable to the window assembly, the guide rail rotatable with respect to the bearings about the longitudinal axis to move the carrier block between the first position and the second position.

7. The window regulator according to claim 6 wherein the guide rail comprises a tubular member having a longitudinal slot, and the carrier block has a first section retained inside the tubular member and a second section projecting through the slot to engage the pane attachment.

8. The window regulator according to claim 6 wherein at least one of the bearings comprises a pin projecting into the guide rail adjacent an end thereof, the guide rail rotatable about the pin.

9. The window regulator according to claim 8 wherein:

the flexible drive member comprises a cable attached to the carrier block and powered by a drive unit located remotely from the guide rail;

the cable extends between the guide rail and the drive member and is housed within a protective conduit; and at least one of the bearings further comprises an integrally formed conduit end fitting for securing an end of the conduit relative to the guide rail.

10. The window regulator according to claim 9 wherein the cable extends through a passage formed in the bearing and into the guide rail for attachment to the carrier block.

11. A window regulator for use with a vehicle window assembly having at least one sliding pane movable along a generally horizontal path between an open and a closed position, the regulator comprising a guide rail with a longitudinal axis adapted to extend parallel to the path of travel of the sliding pane, at least one carrier block engaged with the guide rail for reciprocal movement along the longitudinal axis, a pane attachment securable to the sliding pane, and a drive mechanism for imparting said reciprocal movement to the carrier block, the regulator characterized in that:

first and second bearings are engaged with respective ends of the guide rail and attachable to the window assembly, the guide rail rotatable with respect to the bearings about the longitudinal axis between a first angular position wherein the carrier block is engaged with the pane attachment and a second angular position wherein the carrier block is disengaged from the pane attachment.

12. The window regulator according to claim 11 wherein the guide rail comprises a tubular member having a longitudinal slot, and the carrier block has a first section retained inside the tubular member and a second section projecting through the slot to engage the pane attachment.

13. The window regulator according to claim 11 wherein at least one of the bearings comprises a pin projecting into the guide rail adjacent an end thereof, the guide rail rotatable about the pin.

14. The window regulator according to claim 11 wherein:

the drive mechanism includes a cable attached to the carrier block and extending between the guide rail and a motor located remotely from the guide rail, the cable housed within a protective conduit; and at least one of the bearings further comprises an integrally formed conduit end fitting for securing an end of the conduit relative to the guide rail.

15. The window regulator according to claim 14 wherein the cable extends through a passage formed in the bearing and into the guide rail for attachment to the carrier block.

16. The window regulator according to claim 14 wherein the drive mechanism comprises a drive drum engaged with the cable and rotated by the motor.

17. A window regulator for use with a vehicle window assembly having at least one sliding pane movable along a horizontal path of travel between a closed position and an open position, the regulator comprising:

a guide rail attachable to the window assembly to extend parallel to the path of travel of the sliding pane and comprising a tubular member having a slot extending along a longitudinal axis thereof;

at least one carrier block engaged with the guide rail for reciprocal movement along the longitudinal axis thereof, the carrier block having a first section retained inside the tubular member and a second section projecting through the slot and engageable with the sliding pane;

a reversible drive mechanism comprising at least one cable connected to the carrier block to move the carrier block reciprocally along the guide rail, a motor and drive drum for driving the cable; and first and second end fittings engaged with the respective ends of the guide rail and attachable to the window assembly, each end fitting comprising:

a bearing pin projecting into the end of the guide rail to allow the guide rail to rotate with respect to the bearing pins about the longitudinal axis between a first angular position wherein the carrier block is engaged with the sliding pane and a second angular position wherein the carrier block is disengaged from the sliding pane; and a conduit end fitting for terminating the conduit.

* * * * *